United States Patent
Reiffel

[15] 3,671,668
[45] June 20, 1972

[54] TEACHING SYSTEM EMPLOYING A TELEVISION RECEIVER

[72] Inventor: Leonard Reiffel, 62 East Division, Chicago, Ill. 60610

[22] Filed: Nov. 18, 1968

[21] Appl. No.: 776,723

Related U.S. Application Data

[63] Continuation-in-part of Ser. No. 720,130, April 10, 1968, abandoned.

[52] U.S. Cl.....................................178/6.8, 35/9, 178/DIG. 1, 178/19
[51] Int. Cl.........................................................H04n 7/18
[58] Field of Search..................35/8, 9; 315/10; 178/DIG. 1, 178/6.8, 19; 340/324 A

[56] References Cited

UNITED STATES PATENTS

| | | | |
|---|---|---|---|
| 3,126,646 | 3/1964 | Penraat | 35/9 |
| 3,129,402 | 4/1964 | Henne | 340/324.1 |
| 3,337,860 | 8/1967 | O'Hara | 340/324.1 |
| 3,382,588 | 5/1968 | Serrell | 35/9 |
| 3,394,366 | 7/1968 | Dye | 340/324.1 |
| 3,399,401 | 8/1968 | Ellis | 340/324.1 |
| 3,413,515 | 11/1968 | Haring | 178/6.8 |
| 2,168,047 | 8/1939 | Skellett | 178/19 |
| 2,241,544 | 5/1941 | Dreyer | 178/6.8 X |
| 3,423,528 | 1/1969 | Bradshaw | 178/19 |

OTHER PUBLICATIONS

Bezgin— Generation of X and Y Coordinate Information IBM Tech. Disclosure Bulletin— Vol. 1, No. 6— Apr. 1959— pp. 13, 14

AHMAD— Signal Communication Apparatus— IBM Tech. Disclosure Bulletin— Nov. 1960— Vol. 3, No. 6— pg. 22

*Primary Examiner*—Benedict V. Safourek
*Assistant Examiner*—Joseph A. Orsino, Jr.
*Attorney*—Albert Siegel

[57] ABSTRACT

An electronic audio-visual teaching system employing essentially a cathode ray tube and associated electronic apparatus, and a transparent manually operated spatial response signal generator which coacts with the cathode ray tube whereby feedback between students and teaching machine is readily achieved. Provides considerable ease in programming. Also can be used for remote polling of viewers.

5 Claims, 4 Drawing Figures

INVENTOR.
LEONARD REIFFEL
BY Albert Siegel
ATTY.

TEACHING SYSTEM EMPLOYING A TELEVISION RECEIVER

REFERENCE TO OTHER APPLICATION

This application is a continuation-in-part of my co-pending application, Ser. No. 720,130 filed Apr. 10, 1968 now abandoned.

BACKGROUND OF THE INVENTION

There are presently available a number of audio-visual teaching systems of varying degrees of sophistication. These include simple film strip projectors with or without related audio whereby an individual student or class essentially receives a lecture without intermittent feedback from the student. At the other extreme, as of today's technology, are computer controlled, highly individualized systems whereby the student is required to answer certain pre-programmed questions—respond to the system—and the student proceeds at his own pace.

Film strips or motion pictures and now video tape recordings are relatively easy and inexpensive to program and produce but lack flexibility from the standpoint of the instructor and student and also the student-instructor interplay which so greatly adds to the realism of the "live lecture" presentation. Such interplay appears to be important in the educational or information transfer process. Certain modifications have been made in the simpler systems which do permit a limited student feedback and pace control. For example, there are film strip programs with related audio having questions at spaced intervals and requiring the correct response principally by operations of push buttons or the like before the film strip proceeds to the next position. Teaching machines of this nature are, of course, quite well known to those skilled in the art. While they had been accepted in actual practice, they still present limitations in teacher-student reaction.

Also in present teaching machine art are those systems employing electronic digital computers as one, but very substantial, component thereof. With such devices there is ready interplay—feedback—between student and computer but the initial equipment investment required is relatively great and the educational topic must be programmed into computer language. Between the cost of computers and the cost and difficulty of programming, only a relative handful of these more sophisticated systems have found their way into the classroom.

In distinction of these teaching systems of the prior art, I have invented a novel teaching or information transfer system which is relatively inexpensive, easy to use and manufacture and flexible for both student and instructor or information source.

In the present teaching system as is hereafter described in greater detail, I employ the cathode ray tube and circuitry of a standard home television receiver for example, as one component thereof. I position in front of the face plate of said receiver a manually operated spatial response signal generator which is actuatable by the student and which generates a signal coacting with other signals including the image produced on the video face plate. There must be, or preferably is, correct feedback by the student to continue with the presentation and the student proceeds at his own pace. The same basic equipment is used for programming as is used by the student.

Accordingly, a principal object of my invention is to provide a teaching system where in ready spatial response relative to a television image is accomplished by the student or viewer.

Another object of my invention is to provide a teaching system which employs a cathode ray tube background or instructional display device and means coacting therewith whereby the student may readily respond to and control the pace of the program being presented.

A further object of my invention is to provide an audio-visual teaching system using sub-video frequencies in both the programming and control of the pace of playback wherein proper spatial response relative to a video image are required of the viewer.

Yet another object of my invention is to provide a means "polling" viewers by entirely non-verbal means if desired to their preference among objects or persons displayed tori ally on the TV receiver screen, their selection being pressed via direct contact of the preferred object by manually operated probe associated with the spatial response signal generator.

These and other objects, features and advantages of my invention will become apparent to those skilled in this particular art from the following detailed disclosure thereof and the accompanying drawings in which:

FIG. 1 is a block diagram of my overall system;
FIG. 2 is a schematic diagram of a spatial response signal generator for use herewith; and
FIGS. 3 and 4 are wiring diagrams for use herewith.

DESCRIPTION OF THE PREFERRED EMBODIMENT

Figure 1:
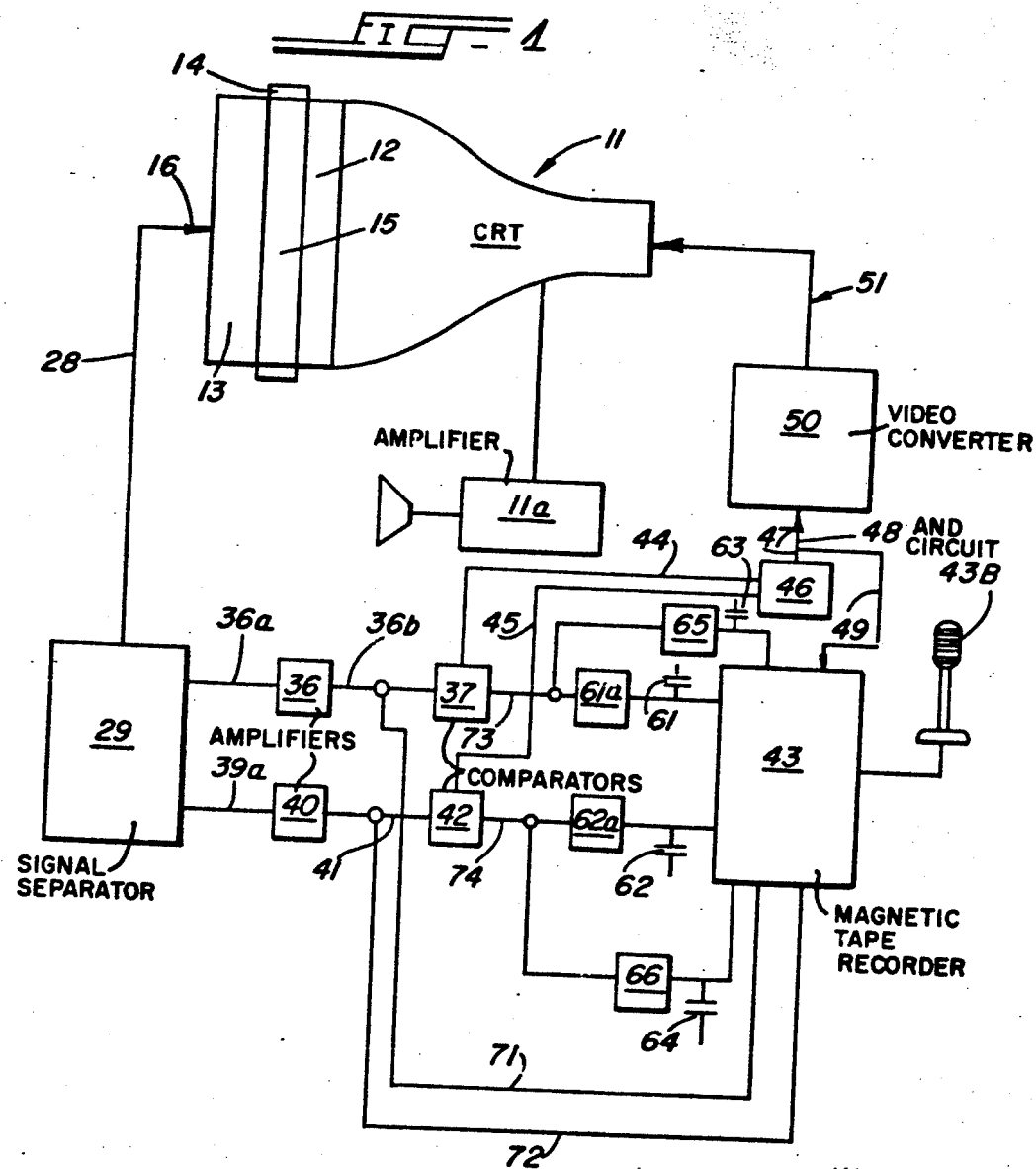

The preferred embodiments hereof will be described in conjunction with such drawings. I would note that this description will essentially be in two parts, the first to consider the apparatus from the "viewers" standpoint, and the second to describe and consider the operation of such apparatus from the "instructor's" standpoint.

In the drawings appended hereto, the numeral 11 refers to cathode ray tube and associated circuitry such as is found the standard television receiver and which has a face plate 1 Positioned in front of said face plate is the spatial signal generator, generally noted by the numeral 13, which I u herewith. Such signal generator is locked into position in fro of face plate 12 as for example, by flanges 14 or the lik There is a slight air space 15 between the front of the fac plate 12 and the back of the generator 13.

A picture is displayed on the face plate of the televisio receiver 11 in the known manner. Such picture and relate audio information, from an audio amplifier and speaker 11 present the basic instructional material—e.g., the lecture an questions relating thereto. A source of such instruction material may be a film slide system with related vide scanning mechanisms and magnetic tape voice recorde known to those skilled in the art and commercially available a the Sylvania Scanner Color Slide Theater (a brochure describ ing which is appended hereto) or the source may be video tap recording or converted movies or any comparable media Preferably both the student, when viewing, and the instructor when programming, should be able to stop the background visual generator at particular points in order to either answe or present questions and the questions are preferably an swered before the program continues. Thus while standard broadcast television can be used with my invention, especially in the "polling" mode to be discussed later, it is preferable, fo purely instructional purposes, that these other means of self-contained, individually paced programming be used herewith.

I would note that the spatial response signal generator 13 is transparent and accordingly images presented on the face plate 12 may readily be seen through such signal generator.

An electrically conducting probe 16 is associated with the signal generator, functions therewith, and is used by both the student and the instructor to pick off an X- and Y-mixed coordinate signal therefrom. How all this is accomplished will be subsequently described.

Figure 2:
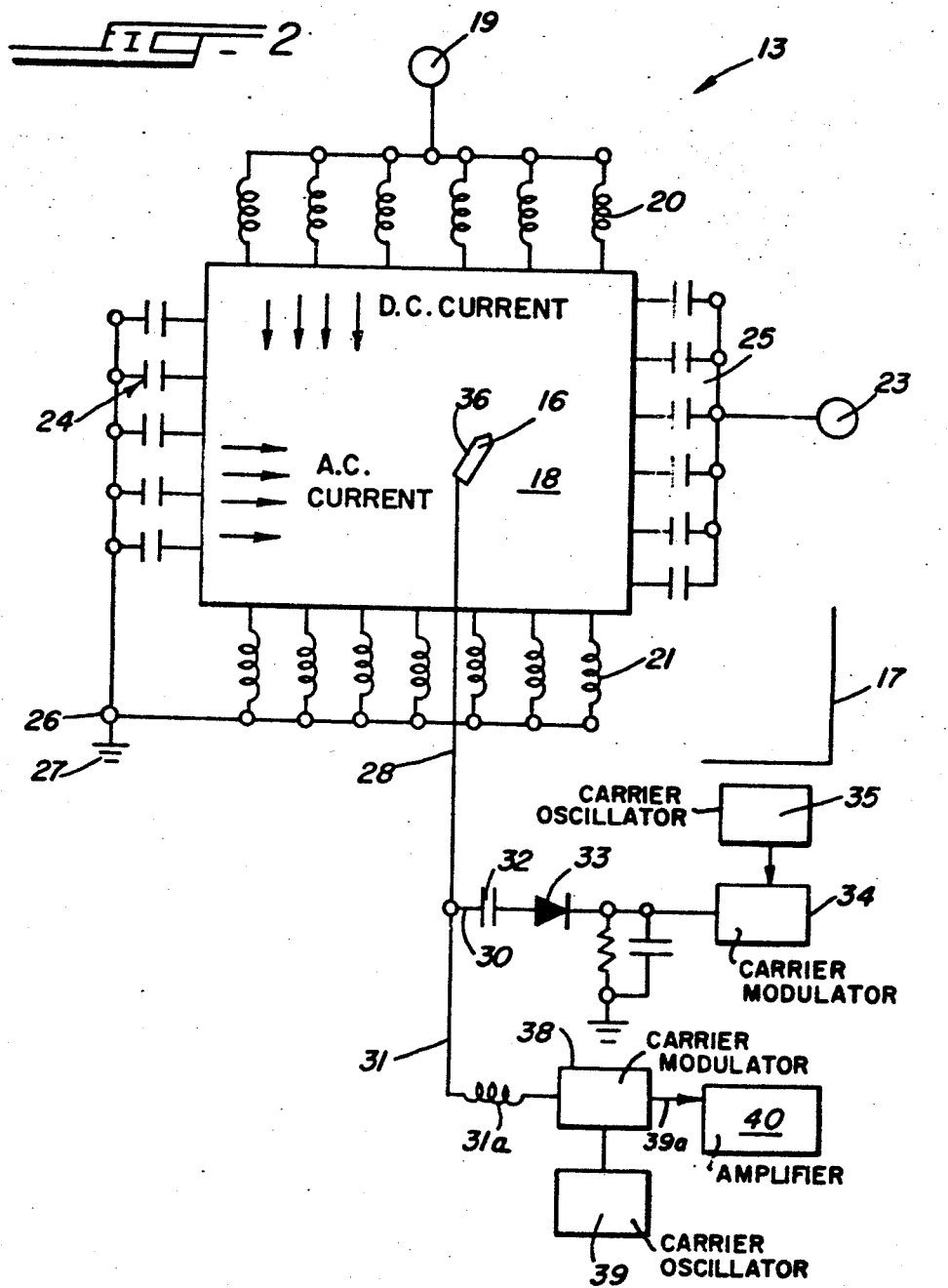

Before proceeding further with the description of my overall system, reference should next be had to FIG. 2 to understand the nature and construction of one embodiment of the spatial response signal generator 13. Such generator is confined within an electrically insulating frame 17 and has an electrically conductive light transparent plate referred to by numeral 18. This plate is preferably of a continuously resistive nature and may be formed, for example, of tin oxide coated electrically conductive glass. It is important in several embodiments hereof that such plate be of a continuously conducting nature.

The probe 16 coacts with the plate. The coaction of the probe and plate is employed to determine and pick off the X- and Y-position of the probe at its point of contact with the plate. Many different means for this are available. For example, a diode switching system or a stylus attached by rigid or string-like members to a pair of potentiometers may be used herewith. Furthermore, a digital position data generator in which the probe position is identified by use of a pair of inter-insulated, intersecting, open grid works of wires or other forms of conducting lines may be employed.

In the embodiment of such plate, as illustrated in FIG. 2, a DC potential is impressed in the vertical direction across the glass plate 18 by a DC generator 19 through the bank of inductors 20 and 21. At the same time an AC potential is impressed in the horizontal direction across the electrically conducting transparent member 18 by an AC generator 23 through a bank of capacitors 24 and 25 which block any effect of the AC circuit on the coacting DC circuit and vice versa. It will be understood, of course, that the AC and DC actuation of the generator could be reversed. Furthermore, as noted above, a diode switching system can similarly be employed in lieu of the capacitors and inductors.

Proceeding with the description, the AC and DC signals are provided with a ground reference 27 by the tie-point contact 26. By this means, an AC signal is superimposed upon the DC and the amplitudes of the signal at any point on plate 18 are proportional to the horizontal and vertical distances of the probe from, for example, the lower left-hand corner of such plate.

The probe 16 picks off a mixed signal from the plate 18 which signal contains electrical information for determining the exact point of contact between probe and plate—i.e., such signal provides the X and Y coordinates of probe position. The signal contains both an AC component giving the horizontal distance and a DC component giving the vertical distance from a reference point usually as noted above the lower left-hand corner of the plate. Such signal is then split into its AC and DC components which take part in the student answering or viewer-polling aspect of the invention, namely whereby the student answers questions posed on the face plate 12 or on the other hand as used by the instructor in programming the apparatus for subsequent instructional use.

The mixed signal picked off by probe 16 is conveyed via lead 28 (at this point reference should be had to both FIG. 1 and 2) to a number of electrical components of known construction which serve essentially to split the signal into the AC and DC components thereof for subsequent use. This is accomplished in the signal separator 29, representative details of which are presented in FIG. 2 along with other circuitry to be used in preparation of programs as will be discussed later.

Lead 28 from the probe 16 is split into leads 30 and 31 in the signal separator 29. The AC and DC components of the signal are split with lead 30 carrying the AC and lead 31 carrying the DC component. In the AC signal carrying lead 30, there is provided a capacitor member 32 which blocks the DC component but permits the AC signal to proceed. Such AC signal is then passed through a rectifier 33 where it is converted to DC and from thence to a carrier modulator 34 operating in conjunction with a carrier oscillator 35. The carrier envelope stemming from the latter contains probe X-coordinate position information which is fed into amplifier 36 via lead 36a.

Similarly, DC signal in lead 31 is fed through an inductive choke 31a to produce a slowly varying DC and from thence into a second carrier modulator 38 operating in conjunction with a second carrier oscillator 39. The carrier envelope stemming from this modulator and oscillator is fed via lead 39a into, for example, the amplifier 40 and used as is subsequently described.

The X-position signal from amplifier 36 is then fed via lead 36b into a signal comparator member 37 while the Y-coordinate signal is amplified in amplifier 40 and fed via lead 41 to a second signal comparator 42.

The numeral 43 denotes a magnetic tape recorder having programmed signals on the media thereof. How such programming is accomplished will be subsequently described this specification but for purposes of discussion at this poi let it be said that the magnetic recorder generates a sig representative of the proper X-coordinate and a second sig representative of the proper Y-coordinate and that in t comparators 37 and 42 the signals from the amplifiers 36 a 40 are compared with the signals coming from the ta recorder.

From the two voltage comparator members 37 and 42 leads 44 and 45 respectively. These feed into an "and" circ member 46 which feeds an "enabling" signal via lead 47, s into leads 48 and 49 into the image storage and video conv tor member 50 and the magnetic recorder 43. The ima storage and convertor member 50 controls the operation the cathode ray tube screen via lead 51.

For the moment, in considering this aspect of the inventio the lead 49 into the tape recorder should be disregarded.

Depending on the position of the probe 16 in contact wi the plate 18, two voltages are generated by the voltage gener tor, namely that of the X-component and the Y-component probe position which are compared with two voltage sign coming from the tape recorder, comparison taking place the voltage comparator members 37 and 42. If the two vo ages are identical of substantially identical, the comparato operate to permit the "and" circuit member 46 to be actuat and this, in turn, enables the video and audio presentation proceed.

I would note that when the signals from the probe 16 a the signals from the magnetic recorder, which I identify signals X' and Y' are being compared in the comparators and 42 the magnetic recorder is essentially stopped—i.e., t tape is not moving. Because of this, the "proper" or X'-sign is stored as a charge on condenser 61, subsequently only an plified by amplifier 61a and the "proper" or Y'-signal is store as a charge in a condenser 62 and subsequently amplified t amplifier 62a. The X'- and Y'-signals are placed on th storage condensers just before the tape recorder is shut dow Their amplitudes are, of course, derived from suitable tracl or carriers placed on the tape by the programmer.

Note that the X- and X'-coordinate voltages and the Y- an Y'-coordinate voltages, if the same, or substantially the sam then trigger the comparators 37 and 42 to send two signals t the "and" circuit member. If the X- and X'-signals are not th same or substantially the same or the Y- and Y'-signals are no the same or substantially the same, the "and" circuit remain inoperative.

At this point in the lesson which is being viewed by the stu dent, the image storage system and video scanning converto 50 is usually presenting a series of signals producing a sta tionary picture on the screen 12 of the cathode ray tube 11. I order that such member 50 signal the presentation of sub sequent pictures, it must receive the correct signal to do s from the "and" circuit member and the converter onl receives such signal if the student has applied the probe 16 t the right place on the spatial generator 13.

For purposes of discussion, assume that the lesson ha proceeded to a certain point and now a question is raised i the pre-programming which question has four possible an swers and that such four possible answers are printed acros the face of the cathode ray tube. These are in different spatia positions obviously, and are noted as answers A, B, C, and D The student is asked to answer the question by applying th probe to points A, B, C or D which identify the answer. For il lustration, assume that the right answer is "A." If the studen applies the probe to a correct position on answer "A," whicl may be the letter itself or a box or some other visual imag area, the probe picks off a certain pair of voltages which ar fed into the comparator members 37 and 42 as described above. At the same time, the correct signal voltages X' and Y have been established on the charge storage condensers 61 and 62 and are likewise being fed into the same respectiv comparators. With the correct answers the voltages are th same and the "and" circuit is triggered which in turn sends the appropriate signal to the image storage and video converter member which in turn recommences the presentation of the next group of images on the face of the cathode ray tube.

Again, for purposes of discussion, assume that the student answers the question by applying the probe to answer "B" rather than the correct answer "A." At this point the voltage X and X' and Y and Y' are different or at least one pair is different and thus the "and" circuit will not be actuated by the incorrect answer. This leaves the same picture on the cathode ray tube for a certain length of time after which by means of a simple timer, the correct answer is presented and the program proceeds. This is accomplished simply by using a timer initiated pulse placed on the magnetic tape by the instructor in the programming. A score can be kept of such "overtime" or no response replies by the student by a standard electro-mechanical counter.

Similarly, for purposes of discussion, rather than having questions written out on the face 12, assume that the pre-programmed information from the instructor audibly, from the related audio system 11a, asks the student, for example, to correctly point out a certain object presented on the face plate on the cathode ray tube screen. For example, with young children or in teaching a foreign language, assume that the instructor asks that they "point out a tree." At this point the video scene is presenting a tree and many other items and the student to answer the question properly must put the probe on the picture of the tree. When the probe is applied to the proper position on the plate, assuming that the answer is correct, again X- and Y-coordinate signals are picked off and fed into the comparator members 37 and 42 and compared with the programmed voltages from the magnetic recorder. If the student has applied the probe to the right place on the plate 18 again the "and" circuit is energized and the program moves on to the next phase.

My system may be programmed with a controlled amount of error or size of the acceptable spatial area to be considered "correct." This may be desirable particularly when a relatively large object is to be pointed out on the plate 12. For example, if the student is requested to point out a tree, the tree involves a certain area and it should not be required that the student touch a very small point on the plate. This is accomplished by providing a controlled amount of "noise" in the X'- and Y'-signals from the tape recorder which in turn produce an area of correct answer space on plate 18. As before, under the control of signals derived from separate tracks or carriers on the tape in playback unit 43, two signals are emitted just prior to the shutdown of the tape drive which is intended to give the viewer time to respond to the query. These two signals $\Delta X'$ and $\Delta Y'$ are the acceptable errors in X and Y that will be considered correct. Voltages proportional to $\Delta X'$ and $\Delta Y'$ are stored on condensers 63 and 64. These voltages are applied to oscillators 65 and 66 which, in accordance with standard designs provide output amplitudes of "noise" proportional to input voltages $\Delta X'$ and $\Delta Y'$. This "noise" is added to the X- and Y-signals applied to the comparators. It will now be seen that the comparators 37 and 42 will be actuated if $X = X' + \Delta X'$ and $Y = Y' \Delta Y'$ respectively, which is the desired result. Appropriate carrier frequencies for the $\Delta X'$- and $\Delta Y'$-signals are put on the magnetic tape with amplitudes proportional to the desired allowable spatial errors in $X$ and $Y$. This is accomplished merely by using a calibrated potentiometer to control the output amplitude of oscillators. The potentiometers are set by the instructor for each answer or response situation.

I wish to turn next to the programming aspects of the present system. For this the same apparatus is used as has been previously described. To set the framework let us first assume that the image storage and converter member 50 has caused a pictorial scene to be presented on face plate 12 along with related audio. While at this point the instructor may merely record audio instruction, for purposes of illustration assume that such scene illustrates a question and four possible answers with related boxes, A, B, C and D. The correct answer is "A" and the instructor wishes to program the voltage coordinates of Box A on the media of the tape recorder 43. The instruct then applies the tip of probe 16 to Box A on generator 13 pick off the coordinate voltages as previously described. T mixed AC-DC signal is fed via lead 28 to the signal separa 29. Two signal voltages are established in leads 36b and 41 now instead of passing into the comparators 37 and 42, leads 71 and 72, having appropriate switching, the split sign X' and Y' are fed into the tape recorder 43 for subsequent by the student. In the same programming sequence, the structor can set in the aforementioned $\Delta X'$- and $\Delta Y'$-sign on appropriate tracks or carriers merely by dialing a pair suitably calibrated voltages into carrier oscillators whi produce signal amplitudes proportional to $\Delta X'$ and $\Delta Y'$ at time the probe 16 is activated by the instructor. When the structor removes the probe from contact with the sig generator plate a signal termination signal is applied to trac of the tape recorder.

After a slight pause, following the recording of such X'- a Y'-signals the programmer energizes a second circuit whi sends an appropriate impulse to the storage member 50, sentially a frame change signal, to cause the next frame frames to be displayed on the face plate 12. At the same ti the recorder 43 is restarted and the programming via probe and leads 71 and 72 is continued, along with verbal comme tary as required fed in through microphone 43b.

By this means the correct answer voltage coordinates a stored on the media of recorder 43.

When the student is using the apparatus and has been ask a question, as before, X- and Y-voltages are fed respective into comparator members 37 and 42. X'- and Y'-signals a $\Delta X'$- and $\Delta Y'$-signals are concurrently being fed into su comparators from the recorder 43 via leads 73 and 74, respe tively. If the answer is correct, impulses via leads 47 and 48 tivate the image converter 50 causing frame change and t same electrical impulse via leads 47 and 49 inform t recorder 43 to move to the next series of X'- , $\Delta X'$- and Y' $\Delta Y'$-tape positions.

In addition to being used as aforedescribed the prese system can be employed for live television polling activiti For this I use a standard home television receiver having t signal generating apparatus, probe, plate and X- and Y-coo dinate splitting means, used in conjunction therewith. T video and audio signals are transmitted as is now done and the face plate 12 is presented a picture for which view response is requested. For example, "which of three ca didates, which of these four packages, etc., do you prefer The viewer applies the probe 16 to his response area and t X- and Y-signals are generated as before. These are compan to X'- and Y'- (with $\Delta X'$ and $\Delta Y'$) signals supplied by t audio carriers then enter the TV receiver along the norm audio of the program. The "and" circuit is thus activated before, under the proper conditions and such signals may stored by activating a punch card marker at the receiver f example, and then mailed to the collecting point or may relayed instantly via phone lines or small dedicated rad transmitters back to a collection point. In the phone li polling system the "and" circuit can merely actuate a "o phone dialer" which is standard equipment or the equivale Ten different groups of 100 viewers each, for example, can assigned different phone numbers and standard totalizers busy signal counters at the exchanges can count the "vote Using automatic dialers with a choice of four phone numbe permits expression by viewers of their choice among fo simultaneous options. To avoid overloading the telepho exchange equipment different small time delays of the ord of seconds can be built into the automatic dialers in differe homes. This is possible using standard techniques because t dialers are of the magnetic recording type and small (diffe ing) lengths of silent tape is all that is required.

Figure 3:
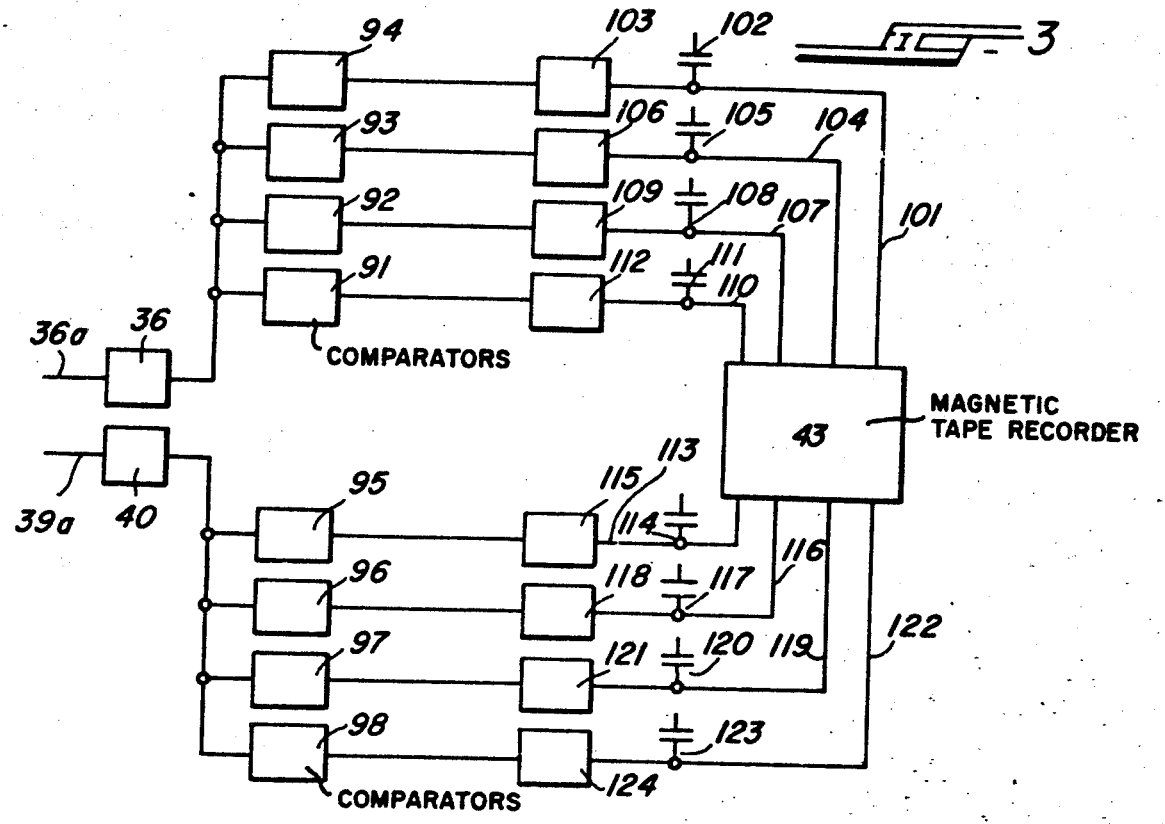

In the discussion thus far I have considered a teachi system and the like wherein if the student answers a questi correctly the program proceeds onto the next series of instru tions and questions or in the alternative if the question is a swered wrong after a predetermined time the program proceeds. I now wish to turn to certain modifications of the present system wherein additional information or the right answer is presented to the student if a question is answered wrong. In conjunction with this discussion reference should be had to FIG. 3.

Again, assume that a question and 4 possible answers, A, B, C and D are projected onto the face plate 12. Voltage coordinates are $X_A Y_A$, Answer A
$X_B Y_B$, Answer B
$X_C Y_C$, Answer C
$X_D Y_D$, Answer D As before the $X$- and $Y$-coordinate voltages of probe 16 are split and fed via leads 36a and 39a to amplifiers 36 and 40, respectively. From amplifier 36, in parallel are connected four $X$-voltage comparators 91, 92, 93 and 94. Similarly, from amplifier 40 are connected, in parallel four $Y$-voltage comparators, 95, 96, 97 and 98.

By the means subsequently described, appropriate voltage coordinate pairs are recorded, i.e., programmed on the media of the tape recorder 43. Disregarding "noise" additions for the moment such recorded voltage pairs are $X'_A Y'_A$, Answer A
$X'_B Y'_B$, Answer B
$X'_C Y'_C$, Answer C
$X'_D Y'_D$, Answer The tape recorder is connected into the comparators 91 through 98 in the same manner as previously described in conjunction with comparators 37 and 42.

Thus:

Lead 101 with capacitor 102 conveys signal $X'_A$ through amplifier 103 to comparator 94;

Lead 104 with capacitor 105 conveys signal $X'_B$ through amplifier 106 to comparator 93;

Lead 107 with capacitor 108 conveys signal $X'_C$ through amplifier 109 to comparator 92;

Lead 110 with capacitor 111 conveys signal $X'_D$ through amplifier 112 to comparator 91;

Lead 113 with capacitor 114 conveys signal $Y'_A$ through amplifier 115 to comparator 95;

Lead 116 with capacitor 117 conveys signal $Y'_B$ through amplifier 118 to comparator 96;

Lead 119 with capacitor 120 conveys signal $Y'_C$ through amplifier 121 to comparator 97; and Lead 112 with capacitor 123 conveys signal $Y'_D$ through amplifier 124 to comparator 98.

If the question posed to the student is answered correctly the present system functions as described earlier. That is, assume that the correct answer is A and this is where the student has applied the probe 16. Comparators 94 and 95 are actuated with $X_A$ being equal to $X'_A$ and $Y_A$ being equal to $Y'_A$. Signals from both comparators energize the "and" circuit member 46 and the main program proceeds.

Figure 4:
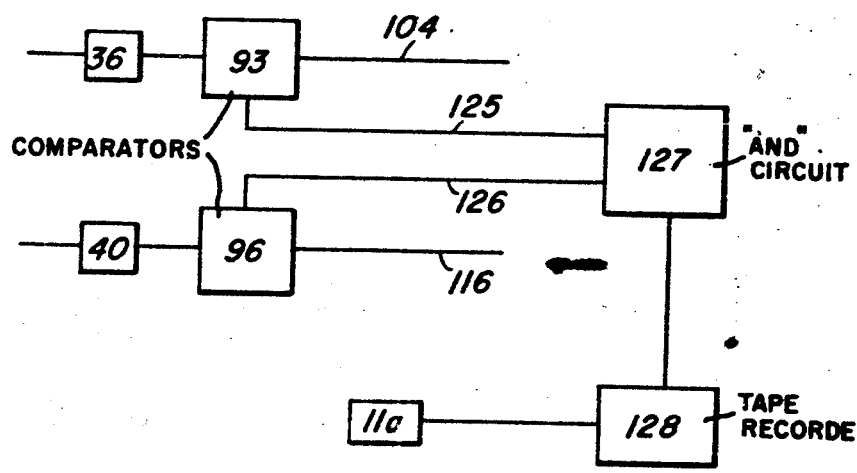

But assume now that the question is answered wrong, that the correct answer is "A" and the student answers "B." Where the probe has been applied to the plate 13, voltages $X_B Y_B$ are generated and fed into comparators 91 and 94 and 95 to 98. The counterpart signals from the recorder, $X'_B Y'_B$, are being fed into comparators 93 and 96 only leaving the other comparators inoperative. Now, please refer to FIG. 4.

Leads 125 and 126 from comparators 93 and 96, respectively connect to a second "and" circuit member 127 pulses in such leads actuate such "and" circuit memb latter member in turn actuates a second pre-record recorder 128 which feeds into the audio speaker mem to add explanatory information to the student. After b for the required time such second recorder advance next position—for the next wrong answer explanation, signal to activate recorder 43 and shuts off for the time The net result is that the student receives suppleme formation which either gives him the right answer or hi and may close with, for example, "try again."

From the foregoing it will, of course, be evident be similar supplemental "and" circuit members and tape ders, etc., are used in conjunction with $X_C Y_C$, and $X_D$ furthermore that in addition to such audio commentar image converters comparable to member 50 can thus a to provide further visual instruction if the student swered the question wrong.

Programming of this more complex embodiment of vention is carried out in the same manner as described except that now the instructor must pre-record the answer explanation as he applies the probe to the answer space. The five tape recorders 43, 128, and th $X'_N Y'_N$ noise must all be operated in the proper seque course.

It will be understood that various modifications and tions may be effected without departing from the sp scope of the novel concepts of my invention.

I claim as my invention:

1. A system useful as a teaching machine or polling sion receivers comprising in combination:
   a. a source of video signals which constitute the basic being transmitted;
   b. image reproduction means for displaying said image;
   c. manually movable probe means operable directly said image reproduction means to electronically and identify an $X - Y$-coordinate in self-defining re tion with respect to said image;
   d. means for pre-defining various fixed sets of $X'$- an coordinates constituting choices of positions relati the same frame of reference as that of the basic imag
   e. comparator means whereby sets of $X'$- and $Y'$-coord information previously defined are directly comp with said probe means defined $X$- and $Y$- coordinal formation such that said $X$- and $Y$-coordinates identified with one specific set of $X'$- and $Y'$-coordin and
   f. storage means containing a fixed, predetermined sto additional information such that the $X'$- and $Y'$-c dinates so identified control the output of said store ditional information means.

2. The system as defined in claim 1 wherein said in reproduction means is a cathode ray tube.

3. The system as defined in claim 1 wherein the $X'$- and coordinates are recorded at sub-video frequency.

4. The system as defined in claim 1 wherein the means pre-defining various fixed sets of coordinates include at one magnetic tape recorder.

5. The system as defined in claim 1 wherein at least coordinate pair is supplied with additive signals defini tolerance region around exact spatial coincidence.

* * * * *